C. B. Morse,
Making Spinning Rings,
N° 76,797.                    Patented Apr. 14, 1868.
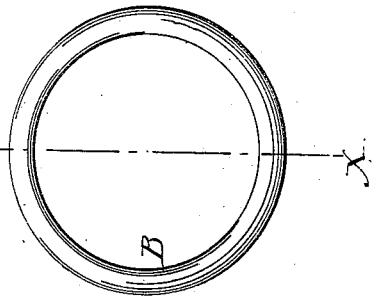
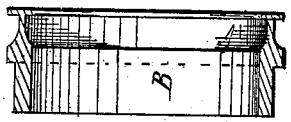
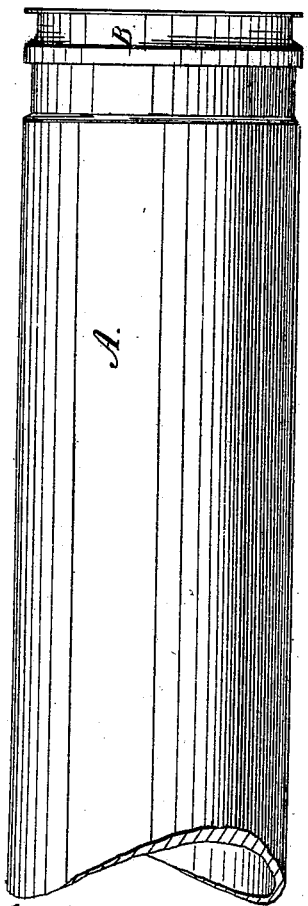
Witnesses:                                Inventor:
Theo Tusche                               C. B. Morse
J. A. Fraser                              Per Munn & Co
                                          Attorneys

United States Patent Office.

CYRUS B. MORSE, OF RHINEBECK, NEW YORK.

Letters Patent No. 76,797, dated April 14, 1868.

IMPROVED METHOD OF MAKING RINGS FOR RING-SPINNING.

*The Schedule referred to in these Letters Patent and making part of the same.*

TO ALL WHOM IT MAY CONCERN:

Be it known that I, CYRUS B. MORSE, of Rhinebeck, in the county of Dutchess, and State of New York, have invented a new and useful Improvement in Rings for Ring-Spinning; and I do hereby declare that the following is a full, clear, and exact description thereof, which will enable those skilled in the art to make and use the same, reference being had to the accompanying drawings, forming part of this specification, in which—

Figure 1 represents a cast-steel tube, showing the manner of forming one of my improved spinning-rings without forging and welding.

Figure 2 is a central section of a finished ring through the line $x\,x$, fig. 3.

Figure 3 is a top view of the finished ring.

Similar letters of reference indicate like parts in the several figures.

My invention consists in part in manufacturing rings for ring and traveller-spinning, from tubular metal, in such manner as to enable me to overcome the imperfections and difficulties caused in ring and traveller-spinning, by the defective rings now in use, by making the rings, in the manner hereinafter described, from highly carbonized cast steel, and also in part by hardening or tempering only the upper or wearing portion or parts, and this at a low heat, thereby avoiding the springing or flattening of the ring, and producing a uniform temper.

The present method of making rings is to take blanks welded or cut from tubes of iron or low steel, of suitable dimensions for a ring, place the same in a chuck to bore out the interior, then drive it on a mandrel to turn its edges and exterior; it is then placed in a chuck to be grooved and finished, after which it is case-hardened in the usual way.

The objection to placing a thin, rough, uneven blank in a chuck is that it forces the same out of its shape, and when taken from the chuck it springs back to its original form, and when it is driven on a mandrel for turning, its shape is again changed, and it changes again when driven off of the mandrel. The ring, when finished, is out of round to greater or less extent, and when case-hardened it is invariably imperfect, never forming a true circle.

The cylindrical steel tube may be produced in various ways. One way is to cast fused steel in moulds into the desired tubular form. However it may be made, I take the metal tube of suitable internal and external diameter, of any convenient length, place the same in a hollow mandrel-lathe, with suitable mechanical devices for holding the same while being operated upon, and forming a finished ring on the end of said tube, cutting off the ring after it is finished, and before removing or changing the tube in the lathe; after which the wearing portion of the ring is tempered or hardened, the remaining portion being left untempered in the usual way of tempering articles made of cast steel.

Having described my invention, what I claim as new, and desire to secure by Letters Patent, is—

1. I claim as a new method in the manufacture of rings, for ring and traveller-spinning, forming a finished ring on the end of metal tubes, and then severing the same from the tube itself, as herein described.

2. I claim making rings, for ring and traveller-spinning, of highly carbonized cast steel, and hardening or tempering at a low heat only the wearing portion or parts of the same, as herein described.

CYRUS B. MORSE.

Witnesses:
ALEX. F. ROBERTS,
J. M. COVINGTON.